United States Patent
Harris et al.

(10) Patent No.: US 7,126,917 B2
(45) Date of Patent: Oct. 24, 2006

(54) METHOD FOR DYNAMICALLY ADJUSTING THE NUMBER OF RETRANSMISSIONS AND NAKS IN A COMMUNICATIONS SYSTEM IMPLEMENTING TCP/IP

(75) Inventors: John M. Harris, Chicago, IL (US); Mark Hetherington, Crystal Lake, IL (US); Ivan Vukovic, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 948 days.

(21) Appl. No.: 10/011,180

(22) Filed: Nov. 8, 2001

(65) Prior Publication Data
US 2003/0086403 A1    May 8, 2003

(51) Int. Cl.
G01R 31/08 (2006.01)
G06F 11/00 (2006.01)
H04L 1/00 (2006.01)
H04L 12/26 (2006.01)
H04J 3/16 (2006.01)
H04J 3/22 (2006.01)

(52) U.S. Cl. .................... 370/235; 370/465
(58) Field of Classification Search ............ 370/229, 370/235, 236, 252, 310, 328, 400, 401, 465, 370/468
See application file for complete search history.

(56) References Cited

U.S. PATENT DOCUMENTS
6,567,388 B1 * 5/2003 Tomcik et al. ............. 370/335

OTHER PUBLICATIONS
"Analytical model for Radio Link Protocol for IS-95 CDMA Systems" by John M. Harris and Manish Airy; IEEE 2000. pp. 2434-2438.
"Rate-Dependent NAK Rounds Support" by Niloai Leung. Qualcomm, Inc., Nov. 8, 1999, pp. 1-6.

\* cited by examiner

*Primary Examiner*—Kevin C. Harper

(57) ABSTRACT

In a communications system implementing Transmission Control Protocol/Internet Protocol (TCP/IP), an apparatus and method for increasing the number of NAKs transmitted by a receiving device when an RLP error is detected in cases where the link speed into the RLP receiver is high, when the TCP window of the sender approaches the maximum or when the percentage of NAKs for which retransmissions cannot be fulfilled approaches a threshold. In a second aspect of the invention, the apparatus and method increases the number of retransmissions transmitted by a sending device when an RLP NAK is received in cases where the link speed out of the RLP sender is high and the transmission round is the first, when the TCP window of the sender approaches the maximum or when the percentage of NAKs for which retransmissions cannot be fulfilled approaches a threshold.

28 Claims, 5 Drawing Sheets

400

METHOD FOR DYNAMICALLY ADJUSTING THE NUMBER OF RETRANSMISSIONS AND NAKS IN A COMMUNICATIONS SYSTEM IMPLEMENTING TCP/IP

FIELD OF THE INVENTION

The present invention relates generally to the field of communication systems, and more particularly, to a method for dynamically adjusting the number of retransmissions transmitted per Negative Acknowledgment (NAK) and number of NAKs transmitted per Radio Link Protocol (RLP) error.

BACKGROUND OF THE INVENTION

Transmission Control Protocol/Internet Protocol (TCP/IP) is the basic communication language or protocol of the Internet. It can also be used as a communications protocol in a private network (either an intranet or an extranet). When one is set up with direct access to the Internet, his or her computer is provided with a copy of the TCP/IP program just as many of the other computers that he or she may send messages to or get information from also has a copy of TCP/IP.

TCP/IP is a two-layer protocol. The higher layer, TCP, manages the assembling of a message or file into smaller packets that are transmitted over the Internet and received by a TCP layer that reassembles the packets into the original message. The lower layer, IP, handles the address part of each packet so that it is routed to the correct destination. Each gateway computer on the network checks this address to determine where to forward the message. Even though some packets from the same message are routed differently than others, they are reassembled at the destination.

In TCP/IP, there is a limit on the number of bytes that can be transmitted before confirmation, usually in the form of an Acknowledgment (ACK), is received. This limit is typically referred to as a current send window (snd_wnd) and is constantly updated during the lifetime of a TCP session. The current snd_wnd is calculated as the minimum of the sender congestion window (cwnd) and the receiver advertised window (rcvwnd). The sender cwnd is an attempt by the sender to estimate from past experience the amount of data it can send without causing network congestion. At the beginning of a TCP session, the sender cwnd starts low and gradually increases as the sender learns how much bandwidth is available. The rcvwnd depends on the memory and processing capabilities of the receiver and is typically 64 Kbytes (the maximum allowed by TCP). However, the rcvwnd could be significantly smaller. The rcvwnd value is typically fixed during the connection and it places an upper limit on the maximum send window (max_snd_wnd) when there is no congestion or packet loss that would limit the sender cwnd. The current snd_wnd value increases until it reaches the max_snd_wnd value, which is typically equal to the rcvwnd. For example, the rcvwnd in a personal computer (PC) running Windows is 64 Kbytes. However, in some TCP/IP implementations such as Sun Solaris 2.6/2.7, the rcvwnd could be 8 Kbytes. In the case of 64 Kbytes, TCP/IP cannot send a single Kbyte past the $64^{th}$ Kbyte if none of the previous 64 Kbytes sent have been acknowledged by the TCP/IP instance with which it is communicating. (Some examples of TCP/IP instances are web page server, email server, and PC.) In other words, once the 64 Kbyte limit is reached, the TCP/IP becomes a stop-and-wait protocol with significantly decreased throughput.

Referring to FIG. 1, a Server or other Host 102 transmits 64 Kbyte frames consisting of, for example, 1.5 Kbyte packets to a Mobile Station (MS) 104. As shown, delay is introduced during the transport of the packets from the Server 102 to the MS 104. In the system, the transmission speed (link speed) is low and the delay is high. The MS 104 receives the first 1.5 Kbyte packet in the first frame and sends a TCP/IP ACK back to the Server 102 while other packets in the same frame are still being transmitted. Because the Server 102 receives the ACK before the entire 64 Kbytes are sent, TCP/IP in the Server 102 does not have to stop transmitting packets and throughput is not decreased. (See bolded lines in FIG. 1.)

FIG. 2 illustrates the transmission of 1.5 Kbyte packets in 64 Kbyte frames in a system where the transmission speed is high and the transport delay is low. In such a case, as in FIG. 1, the MS 104 receives the first 1.5 Kbyte packet and sends a TCP/IP ACK back to the Server 102 while other packets in the same 64 Kbyte frame are still being transmitted. Again, because the Server 102 receives the ACK before the entire 64 Kbytes are sent, TCP/IP in the Server 102 does not have to stop transmitting packets and throughput is not decreased. (See bolded lines in FIG. 2.)

FIG. 3 illustrates the transmission of 1.5 Kbyte packets in 64 Kbyte frames in a system where the transmission speed is high and the transport delay is high. In this case, the Server 102 sends the entire first 64 Kbyte frame to the MS 104 without receiving a TCP/IP ACK for any of the 1.5 Kbyte packets in the first frame. In this situation, the TCP/IP in the Server 102 cannot begin sending any of the packets in the second set of 64 Kbytes in the download. Instead, the TCP/IP becomes a stop-and-wait protocol with significantly decreased throughput.

Next generation CDMA systems, such as CDMA 2000, achieve link speeds higher than current CDMA systems and the maximum delay that can be tolerated is decreased. At 300 Kbps, with a 64 Kbyte max TCP window, the maximum delay that can be tolerated is 2.7 seconds. If current RLP methods are used in next generation CDMA systems, delay is likely to exceed 2.7 seconds in many calls because at higher data rates, the TCP window is exhausted in a shorter time. In CDMA 2000, data calls use RLP to correct errors on the radio link. RLP attempts to correct radio errors in accordance with the method specified in Section 10 of TIA/EIA/IS-707-A-2 (IS-707-A-2). A copy of IS-707-A-2 may be obtained via a world wide web site located at www.tiaonline.org, or by writing to Telecommunications Industry Association, 1300 Pennsylvania Ave., Suite 350, Washington, D.C. 20004 USA. In accordance with IS-707-A-2, RLP attempts to correct radio errors as follows: Consider a new frame before it is transmitted across the radio link for the first time. If the frame is "erased" by the radio link, for Y rounds, the RLP receiver instance (RLP in the receiving device) sends S(Y) number of NAKs to the sender requesting S(Y) copies of the frame. That is, in the first round, the RLP sends S(1) NAKs to the source requesting transmission of S(1) copies of the frame. If none of the copies (retransmissions) arrive, in the second round, RLP sends S(2) NAKs to the source requesting S(2) more copies of the frame. The number of NAKs S(1) and S(2) are negotiated by the RLP at the beginning of the RLP session. This process continues for Y rounds. If all rounds are unsuccessful, RLP aborts (gives up) and the frame that the packet was a part of is corrupted and must be retransmitted by TCP/IP. If two or more TCP/IP packets in a row contain at least one RLP segment or frame, each of which was unsuccessfully retransmitted and led to an abort, TCP/IP is very likely to time out. When TCP/IP times out it typically takes approximately two to three seconds for the corrupted packets to be resent. This is a significant delay, and thus the number of aborts should be minimized.

As the Frame Error Rate (FER) increases, the probability of an RLP abort increases. The amount of overhead caused by RLP retransmissions is represented roughly by the equation $F*S(1)$, where F is the FER seen by the frames and, as set forth above, $S(Y)$ represents the number of NAKs sent for round number Y. In other words, $F*S(1)$ is a good approximation for the average number of retransmissions that must be sent for each new RLP frame that is sent. Thus, the throughput of RLP is roughly $1/(1+F*S(1))$, because for every one new frame sent (the numerator), the total number of frames that must be sent is $1+F*S(1)$ (the denominator). For example, if $S(Y)$ increases from 1 to 3 and $F=10\%$, the RLP throughput decreases from 91% to 77% ($1/(1+(0.10*1)=0.91$ to $1/(1+(0.30*1)=0.77$). However, if $S(1)=3$ rather than $S(1)=1$, the average RLP ordered delay decreases significantly because an RLP frame whose original transmissions is erased, is much more likely to be successfully retransmitted in its first round of retransmissions. (If one sends three retransmissions, it is much more likely that at least one will succeed than if only one is sent.) It follows that a frame delivered in the first round of retransmissions experiences less delay than a frame delivered in the second round of retransmissions.

A paper written by John Harris & Manish Airy describes a method that shows that the average ordered delay decrease in the case described above is roughly 33% (from roughly 220 ms to roughly 145 ms). The paper is entitled *Analytical Model for Radio Link Protocol for IS-95 CDMA Systems* and is published in IEEE Vehicular Technology Conference Proceedings in Spring 2000 (VTC 2000-Spring Tokyo. 2000 IEEE 51st, Volume: 3, 2000 Page's 2434-2438 vol.3). It can be seen from this case that by negotiating more NAKs per round in RLP, one can reduce the RLP delay and decrease the occurrence of TCP/IP becoming a stop-and-wait protocol. However, as described earlier, increasing the number of NAKs per round can cause a decrease in RLP throughput. As shown in FIG. 1, when transmission speed is low, there is no TCP/IP stop-and-wait problem and thus no need to unnecessarily decrease RLP throughput.

Aborts also contribute to decreased RLP throughput in an RLP sender instance (RLP in a sender device). When a data frame is transmitted from a sender device to a receiver device, a copy of the frame is stored in the sender's retransmission buffer. If the frame is not received at the receiver device, the RLP receiver instance sends a NAK X (where X identifies the erased frame's sequence number) to the sender. The RLP sender receives the NAK X requesting retransmission of frame X and attempts to retrieve the copy of frame X from the retransmission buffer. The retransmission buffer has a finite fixed size. For example, consider a case where the retransmission buffer holds exactly D number of RLP frames, where $D=256$. When the $257^{th}$ RLP frame is sent, the sender's RLP retransmission buffer is full, and the first (oldest) RLP frame is deleted from the retransmission buffer to make room for the $257^{th}$ RLP frame. If the RLP sender instance receives a NAK for retransmission of an RLP frame that has been deleted from the RLP retransmission buffer, the RLP sender instance is not capable of satisfying the NAK by retransmitting the RLP frame. When this happens, an RLP miss occurs. For example, an RLP miss generally occurs when a NAK for retransmission of a frame X is received after frame Y, and (Y−X) is greater than D. An RLP frame that experiences a miss, is aborted by RLP (i.e., RLP gives up on the frame and leaves the error to be potentially retransmitted by an application or higher level transport protocol). This causes extra delay and poorer quality of service for the end user. Reducing the RLP delay, as described earlier, reduces the probability of an RLP miss. This is because, an RLP miss tends to occur when a frame must be retransmitted a long time after its original transmissions, e.g. after many rounds of retransmission attempts. If retransmissions succeed in the earlier rounds, the problem of an RLP miss is reduced. One can decrease the RLP delay as described earlier, but this adds cost due the decrease in throughput. Thus, if the RLP miss problem is occurring, the delay should occur.

An RLP miss can be detected at both the sender and receiver. At the RLP sender, an RLP miss can be detected when the RLP receiver receives a NAK that it cannot satisfy because it has deleted it as described earlier. At the RLP receiver, it is more difficult to detect that an RLP miss has occurred. However, for example, if the RLP negotiates a 1,1,1,1,1 scheme, one can track the percent of RLP NAKs that are successful (result in a retransmission) in each round. For example, if 95% of the NAKs in the first 4 rounds are successful, but 0% of the NAKs in the 5th round are successful, the NAK miss problem is occurring in the 5th round. Additionally, if a sufficiently small percentage of the NAKs are last round NAKs, the NAK miss problem is not significant. Further, the RLP receiver can probe for the existence of the NAK miss problem by preemptively sending NAKs for frames that it does not need retransmissions for in order to probe the sender's retransmission buffer depth.

Thus, there is a need for an apparatus and method for dynamically adjusting the number of NAKs sent by an RLP receiver instance when an RLP error is detected in cases where the link speed into the RLP receiver is high, when the TCP window of the sender approaches the maximum, or when the percentage of NAKs for which retransmissions cannot be fulfilled approaches a threshold. There is also a need for an apparatus and method for dynamically adjusting the number of retransmissions sent by an RLP sender instance when a NAK is received in cases where the link speed out of the RLP sender is high, when the TCP window of the sender approaches the maximum or when the percentage of NAKs for which retransmissions cannot be fulfilled approaches a threshold.

DETAILED DESCRIPTION OF THE DRAWINGS

A first aspect of the present invention provides an apparatus and method for dynamically adjusting the number of NAKs sent by an RLP receiver instance when certain conditions are met. A second aspect of the present invention provides an apparatus and method for dynamically adjusting the number of retransmissions sent by an RLP sender instance when certain conditions are met. Dynamically increasing the number of NAKs or retransmissions under certain conditions can decrease the occurrence of RLP aborts and can increase RLP throughput.

Figure 1:
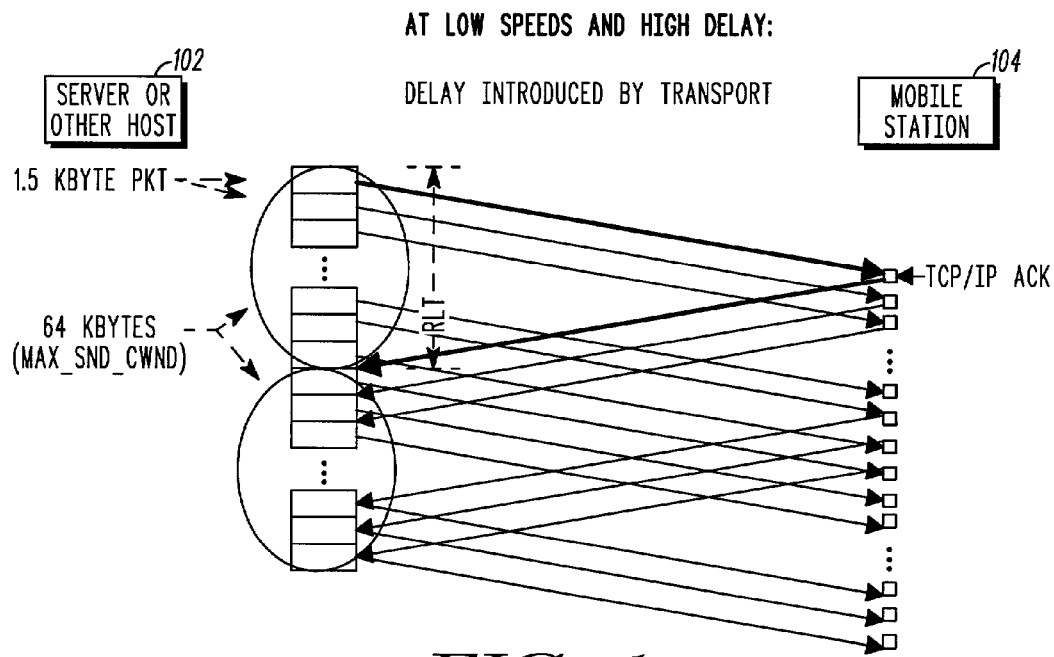
FIG. 1 is a flow diagram representing how information is transmitted between a Server and a Mobile Station in a system having low transmission speed and high delay.
Figure 2:
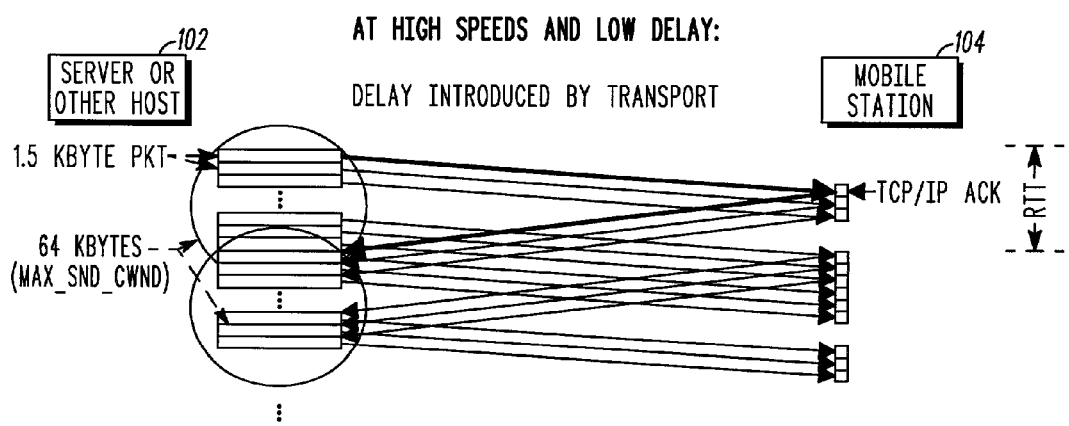
FIG. 2 is a flow diagram representing how information is transmitted between a Server and a Mobile Station in a system having high transmission speed and low delay.
Figure 3:
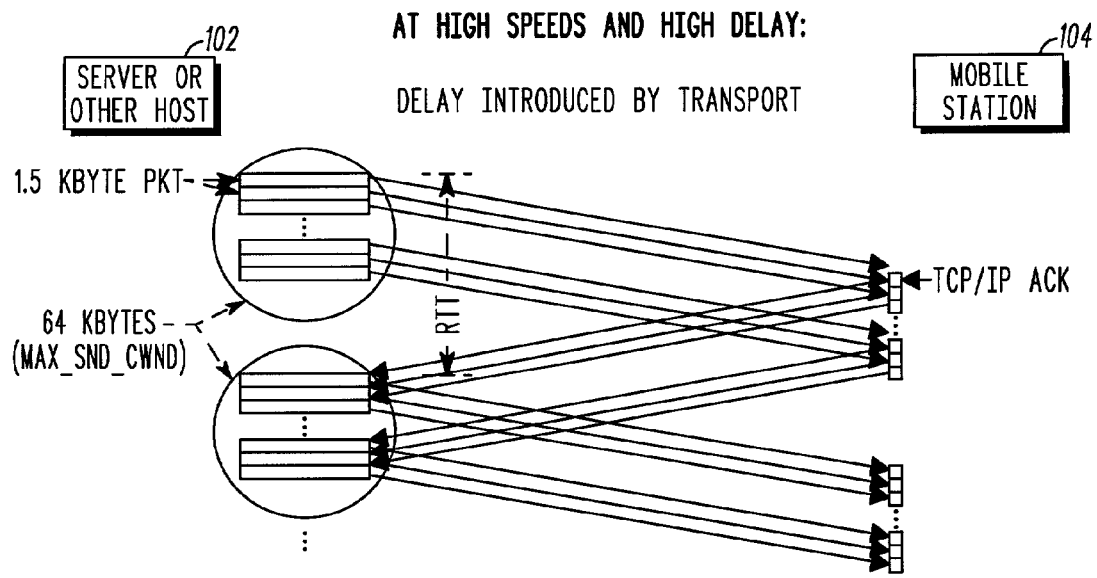
FIG. 3 is a flow diagram representing how information is transmitted between a Server and a Mobile Station in a system having high transmission speed and high delay.
Figure 4:
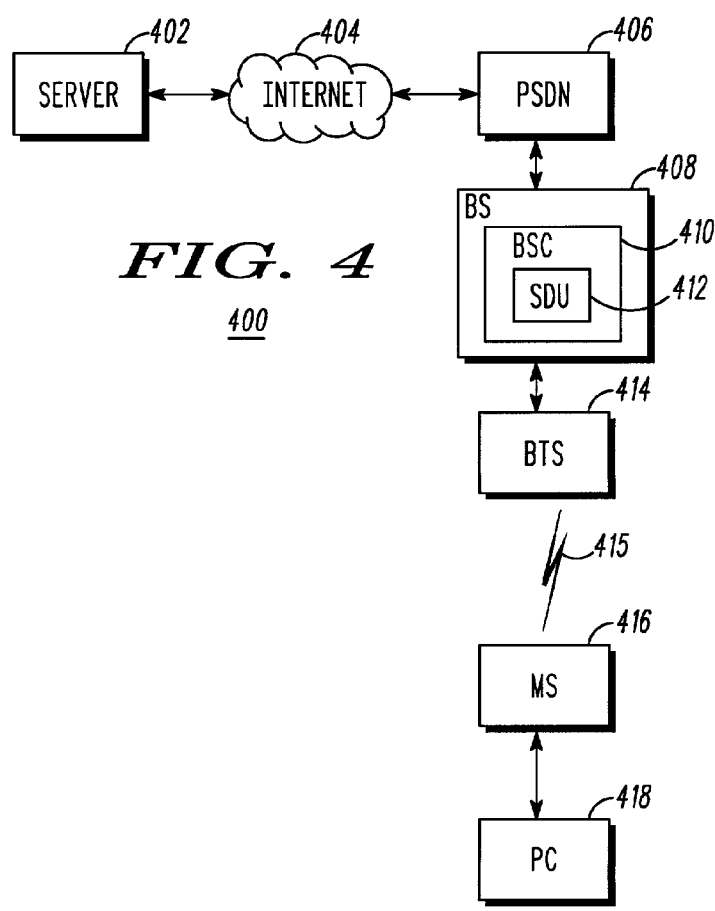
FIG. 4 is a block diagram of a first embodiment of a known system that can be used to implement the present invention.

FIG. 4 is a block diagram of a first embodiment of a known system 400 that can be used to implement the aspects of the present invention. In the system 400, information is downloaded from the Internet 404 to a PC 418 via a MS 416. Information can also be uploaded from the PC 418 to a Server 402. The system includes a server 402 in communication with the Internet 404. The Internet 404 is in communication with a Packet Data Service Node (PDSN) 406 for maintaining mobile connectivity to the Internet. The PDSN 406 is coupled to a Base System (BS) 408, which includes a Base Site Controller (BSC) 410 and a Selection-Distribution Unit (SDU) 412. The BSC 410 implements the fixed side of signaling and control for an air interface (RF link) 415. The SDU 410 selects the best received radio frame for the up-link portion of the air interface 415 and distributes the radio frame to the Base Transceiver Station (BTS) 414 for the downlink portion of the air interface 415. The BTS 414 performs the standard radio transceiver functions, such as coding and modulation, for the air interface 415. The BTS 414 is in wireless communication with the MS 416. The MS 416 is coupled to a PC 418.

Figure 5:
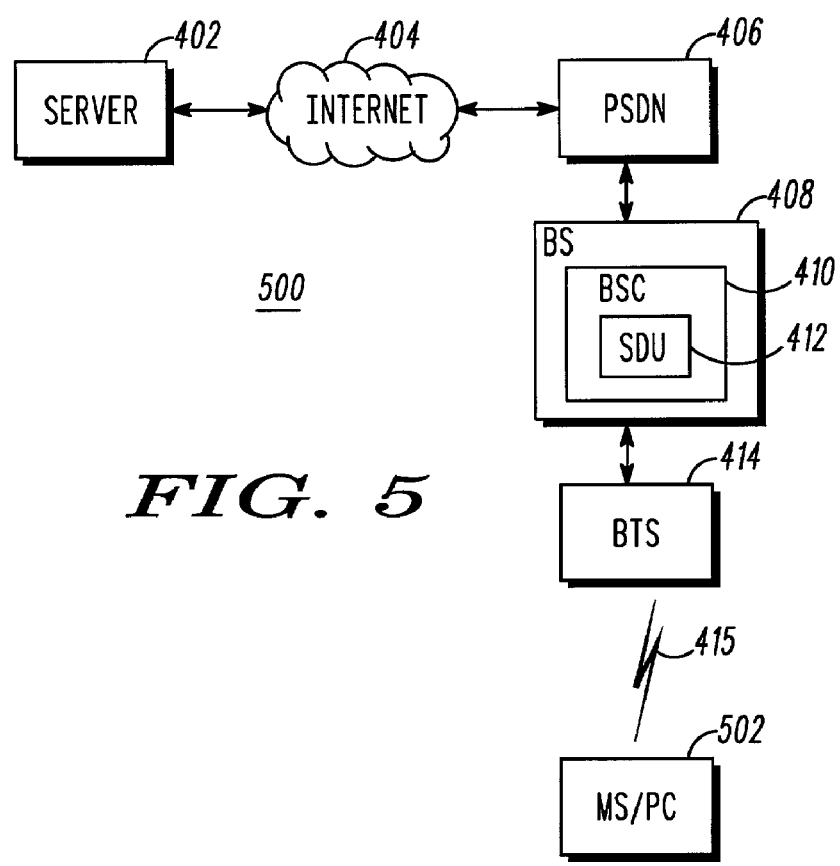
FIG. 5 is a block diagram of a second embodiment of a known system that can be used to implement the present invention.

Referring now to FIG. 5, a block diagram of second embodiment of a known system 500 that can be used to implement the aspects of the present invention is shown. The system of FIG. 5 is similar to that of FIG. 4 except in FIG. 5, the PC functionality is incorporated in the MS as denoted by the MS/PC 502 block. In the MS/PC 502, RLP (which runs in the MS) has access to TCP/IP information. (TCP/IP runs in the PC.) As stated previously herein, TCP/IP has a maximum window that is implementation dependent. This window is referred to as max_snd_wnd and is measured in Kbytes. Typically, the max_snd_wnd is 64 Kbytes. However, in some TCP/IP applications/devices, the maximum window could be 8 Kbytes. Another parameter, snd_wnd, represents the current value of the sender's window. The MS/PC 502 has a snd_wnd for use in uploading information to the Server 402. When TCP/IP has transmitted 64 Kbytes (max_snd_wnd) and the TCP/IP instance with which it is communicating has not acknowledged those bytes, TCP/IP becomes a stop-and-wait protocol with significantly decreased throughput. Generally, the 64 Kbyte limit is approached when the Internet 404 round trip time (RTT) (in seconds) and the link speed (L) (in Kbits/sec) are such that L*RTT/8 approaches being equal to max_snd_wnd.

As an example, the limit is approached when max_snd_wnd is 64 Kbytes, L is 150 Kbits/sec and RTT is 3 seconds: 150*3/8=56.25<64.

In CDMA systems, the 3-second RTT delay value can be reached fairly easily because there are a large number of delay components. Assuming a 150 Kbit/sec link speed, delays in communicating frames of information can be introduced at various points in the system of FIG. 5. In the case of downloading frames to the MS/PC 502, a first Internet 404 delay of approximately 250 to 1000 msecs can occur. This delay represents the time it takes the frame to travel between the Server 402 and the PDSN 406. A scheduling delay of approximately 300 ms can occur at the BS 408 while the BS 408 obtains permission to transmit the frame to the BTS 414 over a supplemental channel (not shown). The time it takes to transmit the packet (80 msec for 1500 bytes) causes delay. If the MS/PC 502 does not receive the frame, an RLP delay will occur. The RLP delay represents the amount of time it takes for the frame to be retransmitted. The MS/PC 502 can cause delay in generating the TCP/IP ACK. In the current example, no delay is assumed. The transmission time of the TCP/IP ACK also causes delay, about 20 msecs for each retransmission. Since the TCP/IP ACK must travel through the Internet 404 to the Server 402, another Internet delay of approximately 250 to 1000 msecs can occur.

In a system like that of FIG. 5 where the MS and PC functionality is combined, the methods of the present invention take advantage of access to TCP/IP parameters snd_wnd and max_snd_wnd. The methods reduce the probability of a frame requiring a large number of rounds to be sent for successful delivery when the TCP/IP is approaching a stop-and-wait protocol as indicated by the nearness of the parameter snd_wnd to max_snd_wnd. Reducing the probability of a frame requiring a large number of rounds increases the amount of retransmissions, which in turn decreases RLP throughput. However, reducing the round trip time (RTT) increases the TCP throughput.

Details regarding the first aspect of the present invention will now be provided. In the systems of FIGS. 4 and 5, the method for dynamically adjusting the number of NAKs sent by an RLP receiver instance is implemented in the MS 416 and MS/PC 502 during a download (information is downloaded to the MS 416 or MS/PC 502), and in the SDU 412 during an upload by any microprocessor or computer commonly known in the art. For example, when the MS 416 (or MS/PC 502) detects erasures of packets transmitted from the Server 402, the MS 416 (or MS/PC 502) implements the method to initiate retransmission of the erased packets. Likewise, when the SDU 412 detects erasures of packets transmitted from the MS 416 (or MS/PC 502), the SDU 412, implements the method to initiate retransmission.

Figure 6:
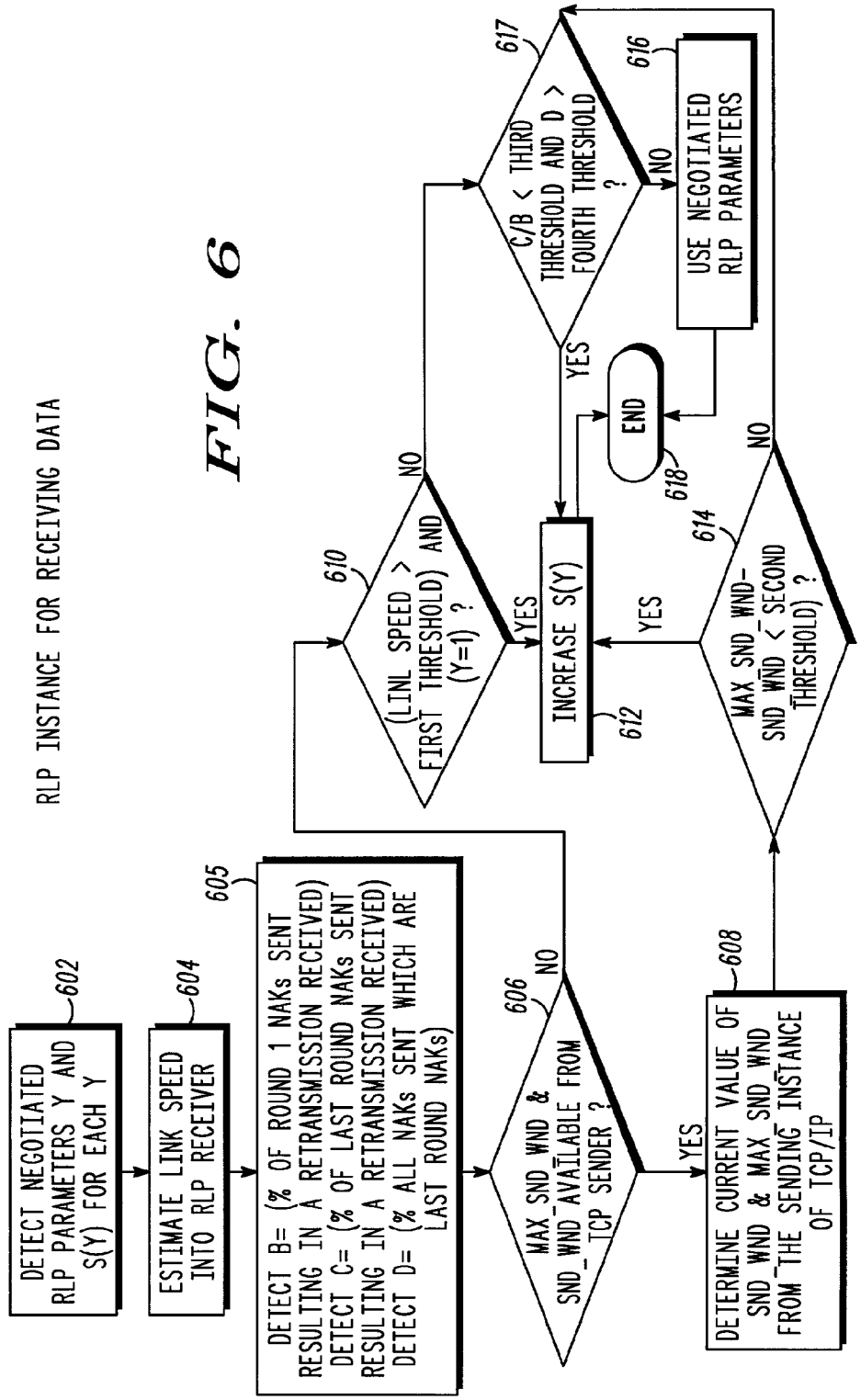
FIG. 6 is a flow diagram of the preferred embodiment of a first aspect of the method of the present invention.

Referring to FIG. 6, a flow diagram of the preferred embodiment of the method for dynamically adjusting the number of NAKs sent by an RLP receiver instance is shown. At the beginning of an RLP session, the RLP parameters (e.g., number of rounds, Y, and the number of NAKs that will be transmitted per round, S(Y)) are negotiated. When an erasure is detected, at step 602, the method detects the negotiated RLP parameters. At step 604, the method estimates the link speed into the RLP receiver (MS 416, MS/PC 502 or SDU 412, whichever is receiving data). In the preferred embodiment, the link speed is estimated by measuring the number of bytes sent through RLP during a predetermined time frame, preferably 1 second. At step 605, the method detects the following values: B=% of $1^{st}$ round NAKs sent resulting in a retransmission received, C=% of last round NAKs resulting in a retransmission received, and D=% of all NAKs sent which are last round NAKs. At step 606, the method determines whether max_snd_wnd & snd_wnd are available from the TCP in the sender device. As previously explained herein, these parameters are available in a system like that of FIG. 5 where TCP is included in the MS or other receiving device. If max_snd_wnd & snd_wnd are available, the method determines their current values (step 608). Typically, max_snd_wnd is negotiated between the sender and receiver. Snd_wnd generally increases throughout the TCP/IP session. If max_snd_wnd & snd_wnd are not available, at step 610, the method determines whether the link speed is greater than a first predetermined threshold, preferably 125 Kbps, and whether RLP is in the first round (Y=1). The first predetermined threshold depends on the TCP window size used and the expected system delay. The 125 Kbps value assumes the maximum TCP window size (64 Kbytes) and certain system delay characteristics. The threshold could be lower for smaller TCP window sizes and/or higher system delay. If the link speed is greater than the first predetermined threshold and Y=1, the method changes the negotiated parameters by increasing the number of NAKs that will be transmitted in the first round (step 612) and the method ends (step 618).

At step 610, if the link speed is not greater than the first predetermined threshold, at step 617, the method determines whether the ratio (C/B) is less than a third predetermined threshold and whether D is greater than a fourth predetermined threshold, where B, C, and D have been detected in step 605. This test estimates whether the RLP miss situation is occurring at the transmitter side as explained previously in the text. The third predetermined threshold is in the range 0–1, preferably at 0.7. The fourth predetermined threshold depends on frame erasure rate and the number of NAK rounds and is preferably 0.0001. If the ratio of C/B is less than the third threshold ad D is greater than the fourth threshold, the method changes the negotiated parameters by increasing the number of NAKs that will be transmitted in the first round (step 612) and the method ends (step 618). If the answer to the test in step 617 is no (either C/B is not less than the third threshold, D is not greater than the fourth threshold, or C/B is not less than the third threshold and D is not greater than the fourth threshold), at step 616, the method maintains the negotiated parameters (leaves the negotiated parameters unchanged) and the method ends (step 618).

Referring back to step 608, after determining the current value of max_snd_wnd and snd_wnd, the method determines whether max_snd_wnd less snd_wnd is less than a second predetermined threshold, preferably 15 Kbytes (step 614). If the answer is yes, the method changes the negotiated parameters by increasing the number of NAKs that will be transmitted in the first round (step 612) and the method ends (step 618). If the answer is no, at step 616, the method maintains the negotiated parameters and the method ends (step 618). In other words, the method determines whether the current value of the TCP window is within a certain predetermined value of the maximum. If the answer is yes, the TCP/IP is approaching a stop and wait situation and the method increases the number of NAKs sent in the first round.

Once the method of FIG. 6 is completed, RLP attempts to correct radio errors in accordance with the method specified in Section 10 of IS-707A, with an increased number of NAKs transmitted in round one when the link speed is above the first threshold, when snd_wnd is within a predetermined number of max_snd_wnd, or when an RLP miss situation is occurring at the transmitter side. By sending a larger number of NAKs in the first round, the method of the present invention minimizes the probability of a frame requiring a large number of rounds for successful transmission.

When the link speed is below the threshold, when snd_wnd has not sufficiently approached max_snd_wnd, or when an RLP miss situation is not occurring at the transmitter side, RLP uses the parameters negotiated at the beginning of the RLP session.

Details regarding the second aspect of the present invention will now be provided. In the systems of FIGS. 4 and 5, the method of dynamically adjusting the number of retransmissions sent by an RLP sender instance is implemented in the SDU 412 during a download and in the MS 416 or MS/PC 502 during an upload by any microprocessor or computer commonly known in the art. Similar to the method of FIG. 6, the current method adjusts the number of retransmissions sent per NAK when the link speed is above a first threshold and when snd_wnd is within a predetermined number of max_snd_wnd. The current method also takes into account the RLP miss problem previously discussed herein. In particular, the method detects the percentage of NAKs received for which retransmissions could be made, and thus the capacity to which the retransmission buffer is filled, and uses the information in deciding whether to increase retransmissions per RLP NAK. This, in turn, reduces the RLP miss rate.

As an illustration of the RLP sender detecting the percentage of NAKs received for which retransmissions can be made, assume that RLP negotiates a 1,1,1,1,1 scheme at the start of the RLP session. One can track the percent of RLP NAKs for which retransmissions are successful in each round. For example, if 95% of the NAKS in the first four rounds are successful, but 0% of the NAKs in the fifth round are successful, the NAK miss problem occurs in the fifth round. Additionally, the RLP sender could preemptively send NAKs for frames it does not need retransmissions for in order to probe the receiver's retransmission depth.

Figure 7:
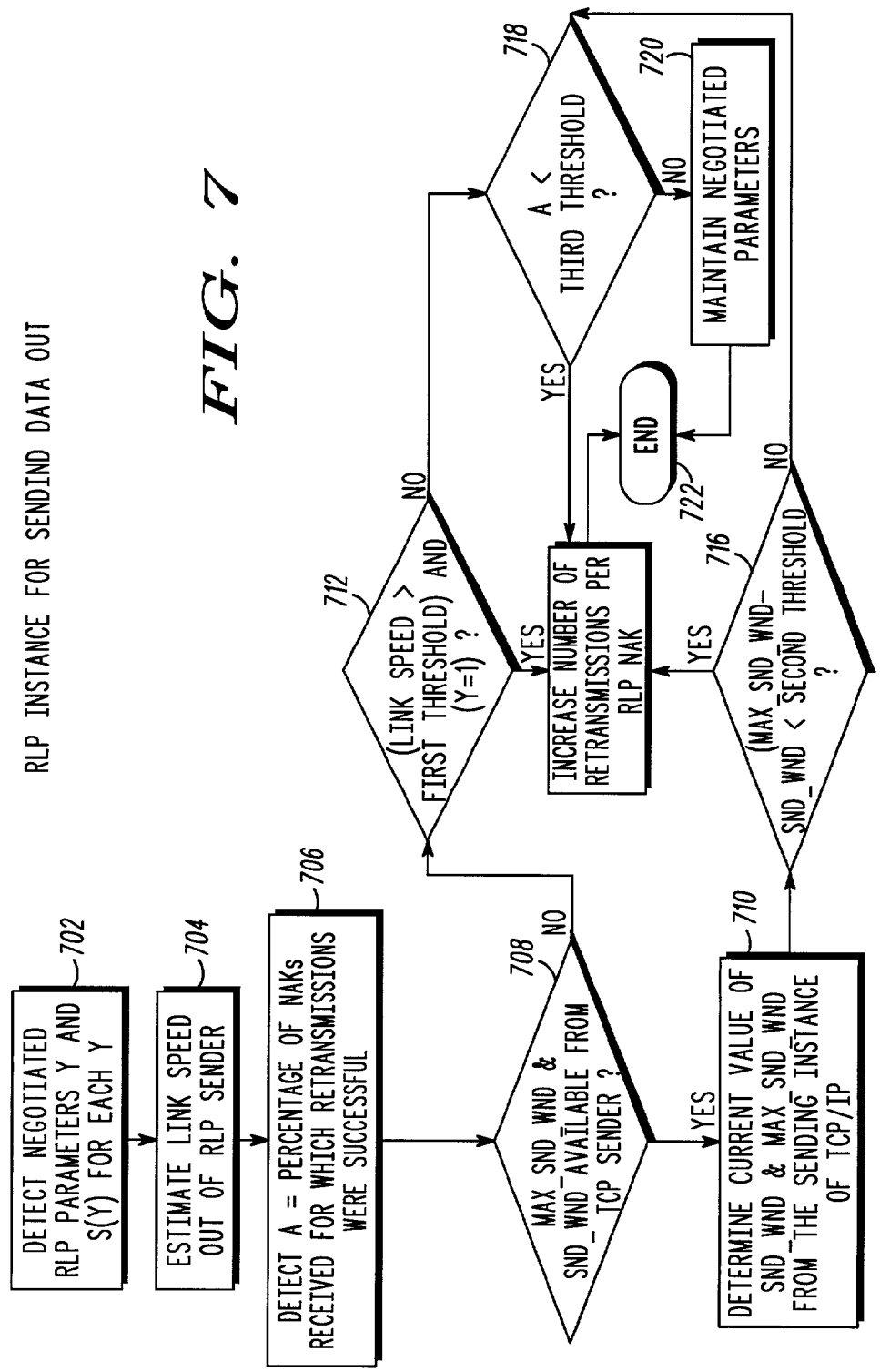
FIG. 7 is a flow diagram of the preferred embodiment of a second aspect of the method of the present invention.

FIG. 7 is a flow diagram of the preferred embodiment of the method for dynamically adjusting the number of retransmissions sent by an RLP sender instance. At step 702, the method detects the pertinent negotiated RLP parameters—number of rounds, number of NAKs to be transmitted per round, and number of retransmissions per RLP NAK. At step 704, the method estimates the link speed out of the RLP sender. At step 706, the method detects the percentage of NAKs received for which retransmissions were successful. At step 708, the method determines whether max_snd_wnd and snd_wnd are available from the TCP in the sender device. If max_snd_wnd and snd_wnd are available, the method determines the current value of max_snd_wnd and snd_wnd (step 710). If max_snd_wnd and snd_wnd are not available, at step 712, the method determines whether the link speed is greater than a first predetermined threshold, preferably 125 Kbps, and whether RLP is in the first round (Y=1). If the answer is yes, the method increases the number of retransmissions sent per RLP NAK (step 714) and the method ends (step 722). If the answer is no, the method determines whether the percentage of NAKs received for which retransmissions were successful is less than a third threshold, preferably 10% (step 718). If the percentage is greater than the third threshold, the method increases the number of retransmissions sent per RLP NAK (step 714) and the method ends (step 722). If the percentage is not greater than the third threshold, the method maintains the negotiated number of retransmissions sent per RLP NAK (step 720) and the method ends (step 722).

Referring back to step 710, after the method determines the current value of max_snd_wnd and snd_wnd, the method determines whether max_snd_wnd less snd_wnd is less than a second threshold, preferably 15 Kbytes (step 716). If the answer is yes, the method increases the number of retransmissions sent per RLP NAK (step 714) and ends (step 722). If the answer is no, the method proceeds to step 718 and continues processing as described above.

Once the method of FIG. 7 is completed, RLP attempts to correct radio errors in accordance with the method specified in Section 10 of IS-707, with an increased number of retransmissions sent in round one when the link speed is above the first threshold, when snd_wnd is within a predetermined number of max_snd_wnd or when the percentage of NAKs received for which retransmissions were successful is less than a third threshold. By sending a larger number of retransmissions in the first round, the method of the present invention minimizes the probability of a frame requiring a large number of rounds for successful transmission.

While the invention may be susceptible to various modifications and alternative forms, a specific embodiment has been shown by way of example in the drawings and has been described in detail herein. However, it should be understood that the invention is not intended to be limited to the particular forms disclosed. Rather, the invention is to cover all modification, equivalents and alternatives falling within the spirit and scope of the invention as defined by the following appended claims.

What is claimed is:

1. In a communications system implementing Transmission Control Protocol/Internet Protocol (TCP/IP), a method of increasing a number of NAKs to be transmitted in a transmission round to a sending device when a Radio Link Protocol (RLP) detects that an error in transmission has occurred, the method comprising the steps of:
   estimating a speed of transmission into the receiving device by measuring a number of bytes sent through RLP during a predetermined time frame; and
   if the speed is greater than a threshold and the transmission round is a first transmission round, increasing the number of NAKs sent in response to the error in transmission.

2. The method of claim 1 wherein the step of increasing the number of NAKs to be sent in response to the error in transmission comprises increasing the number of NAKs from one to two.

3. The method of claim 1 wherein the step of increasing the number of NAKs to be sent in response to the error in transmission comprises increasing the number of NAKs from one to three.

4. In a communications system implementing Transmission Control Protocol/Internet Protocol (TCP/IP), a method of increasing a number of NAKs to be transmitted in a transmission round to a sending device when a Radio Link Protocol (RLP) detects that an error in transmission has occurred, the method comprising the steps of:
   determining the maximum TCP window size of the sending device;
   determining the current TCP window size of the sending device; and
   if the maximum TCP window size less the current TCP window size is less than a threshold, increasing the number of NAKs to be transmitted in response to the error in transmission.

5. The method of claim 4 wherein the step of increasing the number of NAKs sent in response to the error in transmission comprises increasing the number of NAKs from one to two.

6. The method of claim 4 wherein the step of increasing the number of NAKs sent in response to the error in transmission comprises increasing the number of NAKs from one to three.

7. In a communications system implementing Transmission Control Protocol/Internet Protocol (TCP/IP), a method of increasing a number of NAKs to be transmitted in a transmission round to a sending device when a Radio Link Protocol (RLP) detects that an error in transmission has occurred, the method comprising the steps of:
   determining whether an RLP miss situation is occurring at the sending device; and
   if the RLP miss situation is occurring, increasing the number of NAKs sent in response to the error in transmission.

8. The method of claim 7 wherein the step of determining whether an RLP miss situation is occurring at the sending device comprises the steps of:
   determining a percent of first transmission round NAKs transmitted to the sending device that result in a retransmission received by the receiving device;
   determining a percent of last transmission round NAKs transmitted to the sending device that result in a retransmission received by the receiving device;
   determining a percent of all NAKs transmitted to the sending device that are last transmission round NAKs; and
   determining that the RLP miss situation is occurring if the percent of last transmission round NAKs transmitted to the sending device that result in a retransmission received by the receiving device divided by the percent of first transmission round NAKs transmitted to the sending device that result in a retransmission received by the receiving device is less than a first predetermined threshold and the percent of all NAKs transmitted to the sending device that are last transmission round NAKs is greater than a second threshold.

9. In a communications system implementing Transmission Control Protocol/Internet Protocol (TCP/IP), an apparatus for increasing a number of NAKs to be transmitted in a transmission round to a sending device when a Radio Link Protocol (RLP) detects that an error in transmission has occurred, the apparatus comprising:
   a receiving device having a processor operative to estimate a speed of transmission into the receiving device by measuring a number of bytes sent through RLP during a predetermined time frame; and if the speed is greater than a threshold and the transmission round is a first transmission round, increase the number of NAKs to be transmitted in response to the error in transmission.

10. The apparatus of claim 9 wherein the receiving device is a selection and distribution unit and wherein the apparatus further comprises a base transceiver station coupled to the selection and distribution unit for transmitting the NAKs to the sending device.

11. The infrastructure equipment of claim 9 wherein the receiving device is a mobile station.

12. In a communications system implementing Transmission Control Protocol/Internet Protocol (TCP/IP), an apparatus for increasing a number of NAKs transmitted in a transmission round to a sending device when a Radio Link Protocol (RLP) detects that an error in transmission has occurred, the apparatus comprising:
   a mobile station having a processor operative to determine a current TCP window size into the mobile station and a maximum TCP window size into the mobile station; and if the maximum TCP window size less the current TCP window size is less than a threshold, increase the number of NAKs to be transmitted in response to the error in transmission.

13. In a communications system implementing Transmission Control Protocol/Internet Protocol (TCP/IP), an apparatus for increasing a number of NAKs to be transmitted in a transmission round to a sending device when a Radio Link Protocol (RLP) detects that an error in transmission has occurred, the apparatus comprising:

a receiving device having a processor operative to determine whether an RLP miss situation is occurring at the sending device; and if the RLP miss situation is occurring, increase the number of NAKs sent in response to the error in transmission.

14. The apparatus of claim 13 wherein the receiving device is a selection and distribution unit and wherein the apparatus further comprises a base transceiver station coupled to the selection and distribution unit for transmitting the NAKs to the sending device.

15. The apparatus of claim 13 wherein the receiving device is a mobile station.

16. In a communications system implementing Transmission Control Protocol/Internet Protocol (TCP/IP), a method of increasing a number of retransmissions to be transmitted to a receiving device in a transmission round when a sending device receives a Radio Link Protocol (RLP) NAK, the method comprising the steps of:

estimating a speed of transmission out of the sending device by measuring a number of bytes sent through RLP during a predetermined time frame; and if the speed is greater than a first threshold and the transmission round is a first transmission round, increasing the number of retransmissions to be transmitted in response to the RLP NAK.

17. The method of claim 16 further comprising the step of detecting a percentage of NAKs received for which retransmissions were successful.

18. The method of claim 17 wherein if either the speed is not greater than the first threshold or the transmission round is not the first transmission round, the method further comprises the steps of:

determining whether the percentage of NAKs received for which retransmissions were successful is less than a second threshold; and if the percentage of NAKs received for which retransmissions were successful is less than the second threshold, increasing the number of retransmissions to be transmitted in response to the RLP NAK.

19. In a communications system implementing Transmission Control Protocol/Internet Protocol (TCP/IP), a method of increasing a number of retransmissions to be transmitted to a receiving device in a transmission round when a sending device receives a Radio Link Protocol (RLP) NAK, the method comprising the steps of:

determining a maximum TCP window size of the sending device;

determining the device's current TCP window size of the sending device; and if the maximum TCP window size less the current TCP window size is less than a first threshold, increasing the number of retransmissions to be transmitted in response to the RLP NAK.

20. The method of claim 19 further comprising the step of detecting a percentage of NAKs received for which retransmissions were successful.

21. The method of claim 20 wherein if the maximum TCP window size less the current TCP window size is not less than the first threshold, the method further comprises the steps of:

determining whether the percentage of NAKs received for which retransmissions were successful is less than a second threshold; and if the percentage of NAKs received for which retransmissions were successful is less than the second threshold, increasing the number of retransmissions to be transmitted in response to the RLP NAK.

22. In a communications system implementing Transmission Control Protocol/Internet Protocol (TCP/IP), an apparatus for increasing a number of retransmissions to be transmitted to a receiving device in a transmission round when the apparatus receives a Radio Link Protocol (RLP) NAK, the apparatus comprising:

a sending device having a processor operative to estimate a speed of transmission into the sending device by measuring a number of bytes sent through RLP during a predetermined time frame; and if the speed is greater than a threshold and the transmission round is a first transmission round, increase the number of retransmissions to be sent in response to the RLP NAK.

23. The apparatus of claim 22 wherein if the speed is not greater than the threshold or if the transmission round is not the first transmission round, the processor is further operative to detect a percentage of NAKs received for which retransmissions were successful, and if the percentage is greater than a threshold, increase the number of retransmissions to be sent in response to the RLP NAK.

24. The apparatus of claim 23 wherein the sending device is a selection and distribution unit and wherein the apparatus further comprises a base transceiver station coupled to the selection and distribution unit for transmitting the retransmissions to the receiving device.

25. The apparatus of claim 23 wherein the sending device is a mobile station.

26. In a communications system implementing Transmission Control Protocol/Internet Protocol (TCP/IP), an apparatus for increasing a number of retransmissions to be transmitted in a transmission round to a receiving device when the apparatus receives a Radio Link Protocol (RLP) NAK, the apparatus comprising:

a sending device having a processor operative to determine a maximum TCP window size of the sending device and a current TCP window size of the sending device; and if the maximum TCP window size less the current TCP window size is less than a threshold, increase the number of retransmissions to be transmitted in response to the RLP NAK.

27. The apparatus of claim 26 wherein the sending device is a selection and distribution unit and wherein the apparatus further comprises a base transceiver station coupled to the selection and distribution unit for transmitting the retransmissions to the receiving device.

28. The apparatus of claim 27 wherein the sending device is a mobile station.

* * * * *